US007269725B2

(12) United States Patent
Cromer et al.

(10) Patent No.: US 7,269,725 B2
(45) Date of Patent: Sep. 11, 2007

(54) AUTONOMIC BINDING OF SUBSYSTEMS TO SYSTEM TO PREVENT THEFT

(75) Inventors: Daryl C. Cromer, Apex, NC (US); Howard J. Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 445 days.

(21) Appl. No.: 10/738,183

(22) Filed: Dec. 17, 2003

(65) Prior Publication Data

US 2005/0138345 A1 Jun. 23, 2005

(51) Int. Cl.
*G06F 1/24* (2006.01)
*G06F 9/00* (2006.01)

(52) U.S. Cl. .............. 713/100; 713/1; 713/2; 726/25; 726/26; 726/29; 711/164; 719/328; 719/329

(58) Field of Classification Search .......... 726/25, 726/26, 29, 34, 35; 713/1, 2, 100; 710/8–14; 719/328, 329; 711/164
See application file for complete search history.

(56) References Cited

U.S. PATENT DOCUMENTS

| 4,688,169 A | * | 8/1987 | Joshi ................... 726/29 |
| 5,138,706 A | | 8/1992 | Melo et al. |
| 5,734,819 A | * | 3/1998 | Lewis ................... 726/29 |

(Continued)

FOREIGN PATENT DOCUMENTS

JP 2004-070828 3/2004

OTHER PUBLICATIONS

"Incremental Partial Evaluation: The Key to High Performance, Modularity and Portability in Operating Systems", Consel et al, Department of Computer Science and Engineering, Oregon Graduate Institute of Science & Technology, ACM-PEPM'93-6/93/Copenhagen, DK, pp. 44-46.

(Continued)

*Primary Examiner*—A. Elamin
*Assistant Examiner*—James F. Sugent
(74) *Attorney, Agent, or Firm*—Michael J. Medley; Driggs, Hogg & Fry Co., LPA

(57) ABSTRACT

A method is provided of uniquely binding, through connection, a subsystem device having restricted information space for storing code, to a system having a structure for generating and delivering a unique code to identify the system to the information storage space in the subsystem. The method comprises determining if the information storage space in the subsystem has information therein when the subsystem is connected to the system. If no information is contained in the information storage space in the subsystem, the system writes the unique code from the system to the information storage space in the subsystem. If information is in the information storage space, that information is compared with the unique code in the system, and operation of the system is allowed if, and only if, the information in the information storage space matches the unique code generated by the system. A structure for performing this method is also provided.

20 Claims, 5 Drawing Sheets

U.S. PATENT DOCUMENTS

| | | | |
|---|---|---|---|
| 5,887,145 A * | 3/1999 | Harari et al. | 710/301 |
| 5,974,473 A | 10/1999 | Leavitt et al. | |
| 6,032,257 A * | 2/2000 | Olarig et al. | 726/35 |
| 6,104,285 A * | 8/2000 | Stobbe | 340/505 |
| 6,134,659 A * | 10/2000 | Sprong et al. | 713/190 |
| 6,170,059 B1 * | 1/2001 | Pruett et al. | 726/34 |
| 6,230,270 B1 * | 5/2001 | Laczko, Sr. | 726/34 |
| 6,266,724 B1 * | 7/2001 | Harari et al. | 710/301 |
| 6,425,079 B1 * | 7/2002 | Mahmoud | 713/2 |
| 6,463,537 B1 * | 10/2002 | Tello | 713/182 |
| 6,480,831 B1 * | 11/2002 | Cordery et al. | 705/60 |
| 6,490,637 B1 * | 12/2002 | Shih | 710/8 |
| 6,553,495 B1 * | 4/2003 | Johansson et al. | 726/35 |
| 6,990,685 B1 * | 1/2006 | Christensen et al. | 726/34 |
| 7,100,036 B2 * | 8/2006 | Schwartz | 713/2 |
| 7,137,011 B1 * | 11/2006 | Harari et al. | 713/189 |
| 2001/0007131 A1 * | 7/2001 | Galasso et al. | 713/187 |
| 2002/0026591 A1 | 2/2002 | Hartley et al. | |
| 2002/0083426 A1 | 6/2002 | Sistla | |
| 2002/0087883 A1 | 7/2002 | Wohlgemuth et al. | |
| 2003/0005178 A1 | 1/2003 | Hemsath | |
| 2004/0044903 A1 * | 3/2004 | Komatsu | 713/200 |
| 2004/0170068 A1 * | 9/2004 | Williams | 365/200 |

OTHER PUBLICATIONS

"Binding-Time Analysis and the Taming of C Pointers", Lars Ole Andersen, DIKU, University of Copenhagen, ACM-PEPM'93-6/93/Copenhagen, DK, pp. 47-58.

* cited by examiner

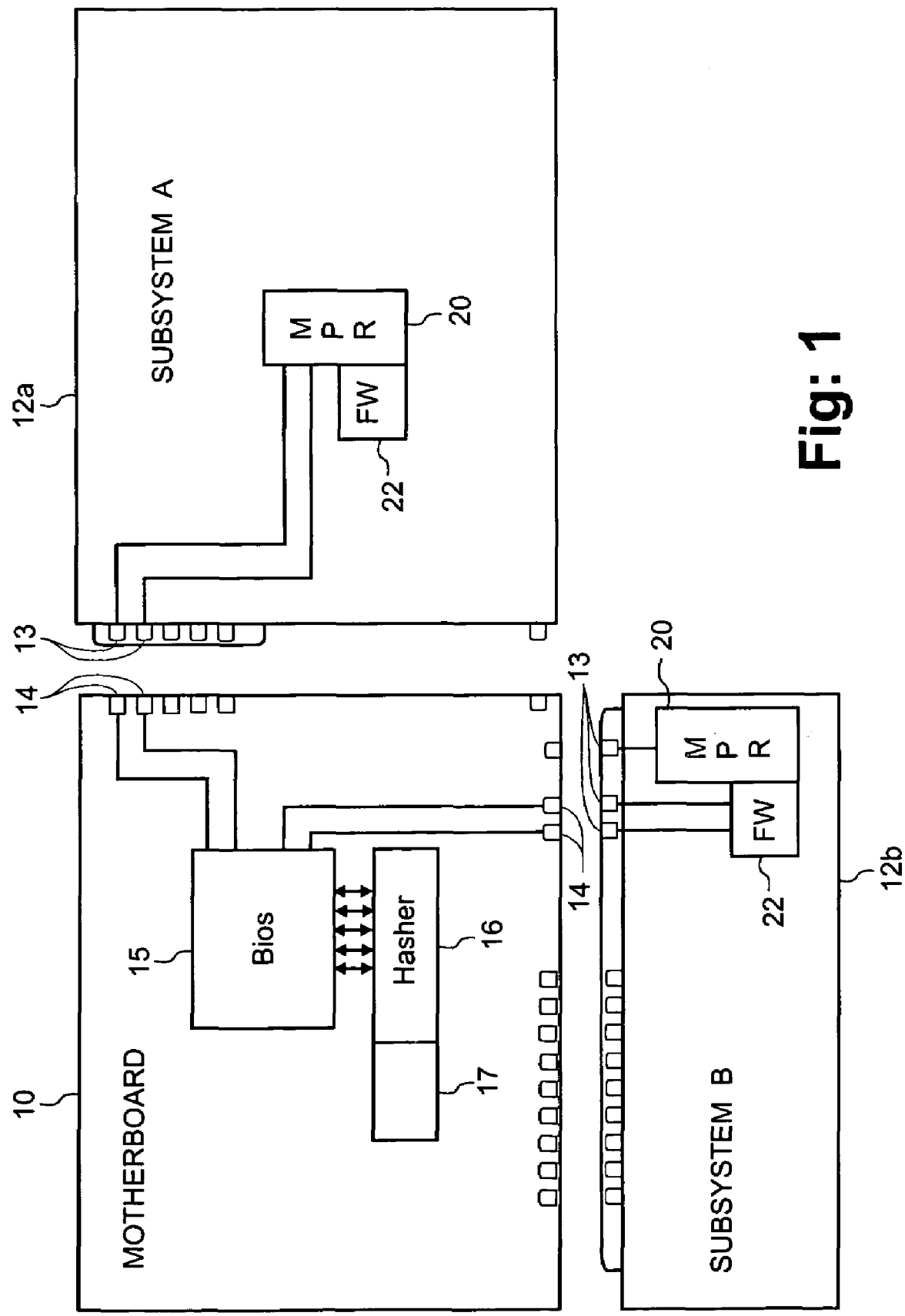
Fig: 1

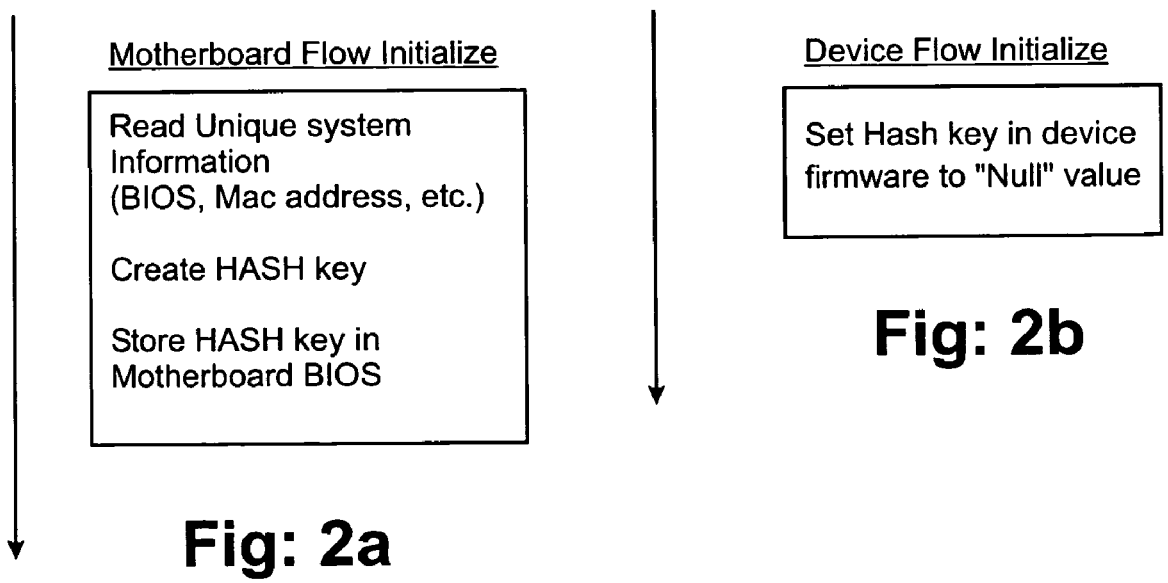

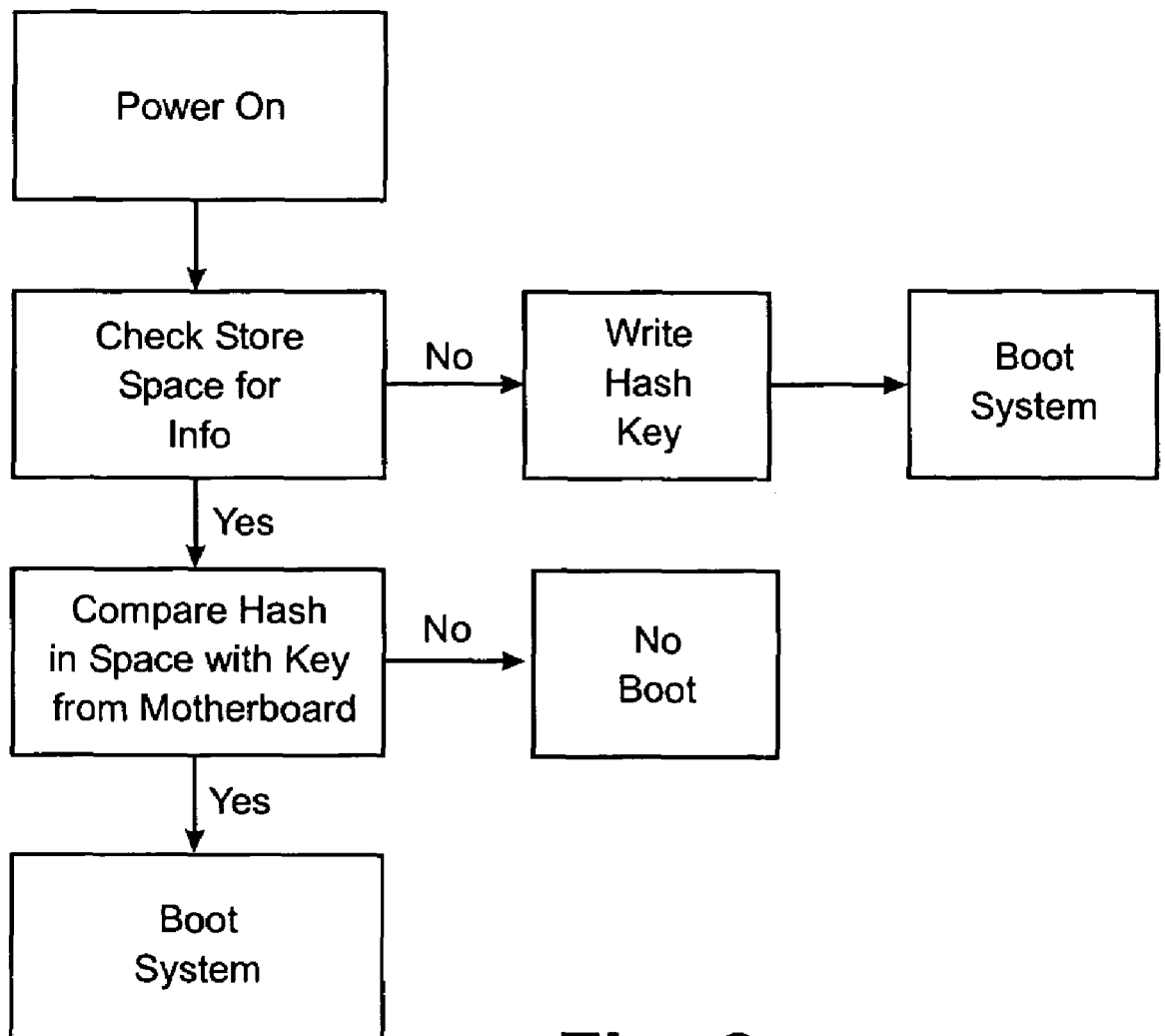
Fig: 3

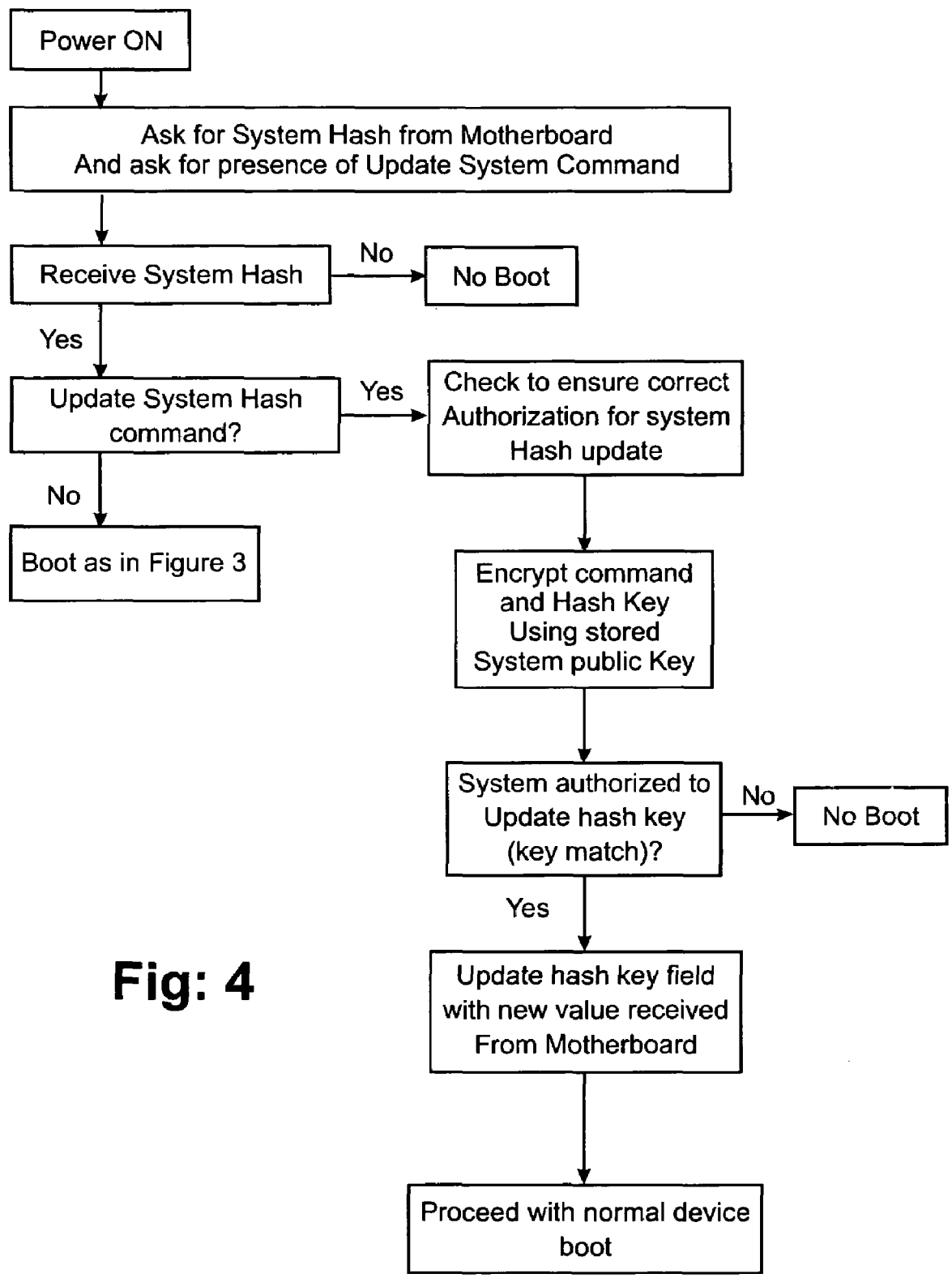
Fig: 4

System Flow Initialize

Read Unique system Information
(BIOS, Mac address, etc.)

Create HASH key

Store HASH key in Motherboard BIOS

Create Public Key

Create Private Key

Create Password

Store Password

Fig: 5

AUTONOMIC BINDING OF SUBSYSTEMS TO SYSTEM TO PREVENT THEFT

FIELD OF THE INVENTION

This invention relates generally to computer systems, and more particularly to computer systems comprised of a motherboard and several subsystems removably attached thereto. In even more particular aspects, this invention relates to such a system wherein the subsystems are autonomically uniquely bonded to a given motherboard and, if connected to another motherboard, the subsystems are rendered inoperable.

BACKGROUND OF THE INVENTION

Computer systems today may be comprised of many different components, eg. a motherboard, such as a CPU, and several subsystems, such as hard drives, add-on cards, optical adapters, even processors and co-processors. The subsystems are connected to the motherboard with cables or connectors. Such subsystems can be unauthorizedly removed either for theft and/or unlawfully obtaining sensitive information. With the open landscaping of today, and the easy accessibility of the subsystems, this is becoming bigger and bigger problem. It is possible to remove a subsystem and insert it into a different motherboard, thereby gaining access to sensitive information and/or reusing the subsystem therewith.

Present day solutions include the user having to type in a password which is matched to the subsystem. This solution has several drawbacks. First, it requires that the user remember and type in a selected password. Also, theft by the user is not prevented since the user, knowing the password, is able to use or tell others how to use the subsystems on any other motherboard

SUMMARY OF THE INVENTION

A method is provided for uniquely binding, through connection, a subsystem device having a microprocessor and restricted information space for storing code to a motherboard, having a structure for generating and delivering a unique code to identify said motherboard to the information storage space in said subsystem. The method comprises the steps of:

Creating a unique code for the system, and determining if the information storage space in the subsystem has information therein when the subsystem is connected to the system. Then, if no information is contained in the information storage space in the subsystem (i.e. the storage space is set to null), the motherboard writes the unique code from the motherboard to the information storage space in the subsystem. If there is information in the information storage space, the information in the storage space is compared with the unique code in the motherboard, and operation of the system or subsystem is allowed if, and only if, the information in the information storage space matches the unique code generated by the motherboard. In one embodiment, a unique authorization is provided to allow change in the unique code if,.and only if, a person has the unique authorization. A structure for performing this method is also provided.

BRIEF DESCRIPTION OF THE DRAWINGS

FIG. 1 is a diagrammatic representation of a motherboard and subsystems, and interconnections thereof, according to this invention;

FIG. 2a shows the sequence in manufacturing for generating the unique code in the motherboard;

FIG. 2b shows the manufacturing sequence for initially setting a subsystem;

FIG. 3 is a flow chart showing the operation of one embodiment of this invention;

FIG. 4 is a flow chart showing the operation of another embodiment of this invention; and FIG. 5 is a view similar to FIG. 2a showing a sequence of manufacturing where an authorization password is generated to change the unique code.

DETAILED DESCRIPTION OF THE PREFERRED EMBODIMENT(S)

Referring now to the drawings, and for the present to FIG. 1, a very high level, diagrammatic drawing of a system including a motherboard and two associated subsystems is shown. It is to be understood that there could be many more subsystems or even just one subsystem attached to the motherboard, but two are used for illustration. As shown in FIG. 1, a computer main or motherboard 10 is shown, with subsystems 12a, 12b attached thereto through pins 13 on subsystems 12a, 12b and sockets 14 in motherboard 10. Conventionally, the motherboard 10 will have a system BIOS (Basic Input Output System) 15, which BIOS 15 contains information unique to the particular system and storage space or a field for storing a unique key. This unique information can include the system serial number, its MAC address and/or other unique fields added. thereto.

A hashing program 16, which is a part of or controlled by a microprocessor 17 shown diagrammatically, is provided to hash selected unique information from the motherboard 10, and store the hashed value in a field in the BIOS 15 provided for that purpose, and which is write protected. Hashing, as used herein, means the transformation of an amount of data even up to the entire content of all the unique information on motherboard 10, into a unique, short, fixed length value, or key, that represents the specific motherboard 10. Since each motherboard 10 contains information unique to that particular system, the hash value or key is different for each system. Any hashing algorithm can be used to perform the hashing, but the industry standard MD5 algorithm is preferred.

Each subsystem 12a, 12b contains a microprocessor 20 with firm ware 22 defining a restricted storage space sufficiently large enough to store the hash key or value. As used herein, the term "restricted storage space" means a storage space that, once written to, cannot be changed, or can be erased only in conjunction with a unique authorization. In one embodiment, the restricted configuration of the firm ware 22 is a WORM (Write Once Read Many) configuration such that once a value has been written into the firm ware 22, it cannot be erased or changed.

Referring now to FIG. 2a, the flow of the initial set up of the motherboard is illustrated. As shown in FIG. 2a, a program first reads the information in the motherboard 10 that is to be used for the hash key. The program then creates the unique hash key and stores the created hash key in the field in the BIOS 15 for the hash key. As noted above, the storage of the hash key is write protected. As shown in FIG. 2b, the firm ware in each subsystem 12a, 12b is initially set to null value, i.e. a value that indicates no data and that the subsystem 12a, 12b is in condition to receive the hash code from the motherboard 10. This will allow the motherboard to write the unique hash key to any subsystem 12a, 12b having a null value upon initial boot.

When a subsystem 12a, 12b is attached to an motherboard 10, the motherboard 10 has a program that first looks to the subsystem 12a or 12b to see if there is any information in the firm ware 22 contained within the subsystem 12a, 12b, i.e.

if the firmware is set at null. If there is not any information, which will be the case on the first booting of the motherboard 10 with a new subsystem 12a or 12b attached, then the program will write the unique hash key to the firm ware 22 that is write restricted, which will thus uniquely bind the subsystem 12a or 12b to the motherboard 10. It is possible that the subsystem 12a, 12b will check to see if null value exists therein and, if null value does exist, request the hash key from the motherboard 10. The writing of the unique hash key to the firm ware 22 within subsystem 12a, 12b is by means of either the subsystem 12a or 12b directly reading the hash key from the BIOS 15 or by the motherboard 10 passing the hash key to the subsystem 12a or 12b. Since the field in the BIOS 15 that contains the hash key is write protected, this key cannot be erased or changed, thus uniquely binding the subsystem 12a or 12b to the motherboard 10 having the unique code for that system.

On subsequent boots of the system, the program in the motherboard 10 looks to the firm ware 22 in each subsystem 12a, 12b and determines that the firm ware 22 has information therein. The information in the firm ware 22 of the subsystem 12a or 12b is then compared to the hash key stored in the BIOS 15 of the motherboard 10. This comparison is done by a program in the subsystem 12a, 12b with the hash key sent from the motherboard 10 to the subsystem 12a, 12b, or by the motherboard 10 having the information in the firm ware 22 of the subsystem 12a, 12b sent to it for comparison with the hash key stored in the BIOS 15. If the information in the firm ware 22 of subsystem 12a, 12b matches the hash key in the motherboard 10 (as stored in the BIOS 15), then the boot sequence proceeds, but if there is not a match, the program causes the boot sequence to be discontinued, and the system is not booted and the subsystem 12a or 12b is disabled. This is all shown in the flow chart of FIG. 3. Thus, once any subsystem 12a, 12b is bound to a motherboard 10 by writing a unique code from the motherboard 10 to the subsystem 12a or 12b, the subsystem 12a, 12b cannot be used in another system since the code in the firm ware 22 of subsystem 12a or 12b cannot be changed.

In another embodiment of the invention, the information in the storage space 22 can be changed, but only by a person having the correct authorization. Thus, if it is desired to move subsystem 12a or 12b to another system, a person having the correct authorization can erase the information in the storage space 22, and allow the subsystem 12a or 12b to be moved to another system 10, and bound to that other system, and stay bound thereto until any information in the space 22 is again erased by a person having the proper authorization. The flow chart for such an embodiment is shown in FIG. 4. The authorization scheme used is preferably the Public/Private key encryption scheme, although other schemes can be used. The Public/Private key encryption is well known in the art-and is briefly described in the following web site: http://computer.howstuffworks.com/encryption1.htm, although other encryption schemes can be used. In essence, a private and public key pair is created for the subsystem at device flow initialize (FIG. 2b). The authorized person also has a unique private and public key pair. The authorized person's public key is stored within the subsystem at device flow initialize. The authorized person also has access to the public key of the subsystems. To change the hash value, the authorized person encodes the change hash command with the authorized person's private key and the subsystem public key. When the subsystem receives the encrypted command, it attempts to decode it using the authorized person's public key, which is stored in the firm ware, and the subsystem private key. Only this combination will decode the command correctly and if, and only if, the correct authorization is used, the firm ware 22 in the subsystem 12a, 12b will be reset to a null value, ready to be initialized by a new motherboard. This concept can be expanded so each subsystem has a different private and public key pair. It is also possible to do the key initialization at any time during the subsystem life cycle vs. initial manufacturing.

The foregoing description of the exemplary embodiment of the invention has been presented for the purposes of illustration and description. It is not intended to be exhaustive or to limit the invention to the precise embodiment disclosed. Many modifications and variations are possible in light of the above teaching. It is intended that the scope of the invention be limited, not with this detailed description, but rather by the claims appended hereto.

What is claimed is:

1. A structure for uniquely binding, through connection, a subsystem device having a microprocessor and restricted information storage space for storing code, to a motherboard having a program for generating and delivering a unique code to identify said motherboard to said information storage space in said subsystem, comprising:
   a program to determine if said information storage space in said subsystem has information therein when said subsystem is connected to said motherboard and, if no code is contained in said information storage space in said subsystem, then writing said unique code from said motherboard to said information storage space in said subsystem; and, if there is information in said information storage space, comparing said information in said storage space with said unique code, and allowing the operation of the subsystem device if, and only if, said information in said information storage space matches said unique code generated by said motherboard.

2. The structure as defined in claim 1 wherein said unique code uniquely identifies said motherboard and is hashed.

3. The structure as defined in claim 2 wherein said information that is hashed is contained, at least in part, in a BIOS in said motherboard and is write protected.

4. The structure as defined in claim 2 wherein said unique code includes the hashed motherboard serial number.

5. The structure as defined in claim 1 wherein a restriction on writing in said information storage space is provided by a unique authorization that allows the information storage space to be overwritten when it contains code only in response to said unique authorization.

6. The structure as defined in claim 1 wherein the motherboard includes a program to prevent booting of the subsystem device if there is information in said information storage space that differs from said unique code.

7. The structure according to claim 1 wherein said restricted information space in the subsystem device is a WORM configuration.

8. A method for preventing a subsystem device from functioning when it is disconnected from a motherboard of a functional computer system, comprising:
   a. generating a code in the motherboard that uniquely identifies the motherboard;
   b. delivering the code to a storage space of the subsystem device;
   c. storing the code in the subsystem device;
   d. comparing the code stored in the subsystem device with the code generated by the motherboard, and e. allowing the subsystem device to function if and only if the code stored in the device matches the code generated by the motherboard.

9. The method as defined in claim 8 wherein said a restriction on writing in said storage space is provided by a unique authorization that allows the storage space to be overwritten, when it contains code, only in response to said unique authorization.

10. The method as defined in claim 8 wherein said code includes the hashed motherboard serial number.

11. The method as defined in claim 8 wherein the motherboard includes a program to prevent booting of the subsystem if there is information in said storage space that differs from said code that uniquely identifies the motherboard.

12. The method according to claim 8 further including hashing the code and storing the hashed code in the BIOS of the computer system.

13. The method according to claim 8 further including configuring the restricted information space in the subsystem device as a WORM configuration.

14. A motherboard configured to perform the following acts:
   detecting that a subsystem has been coupled to the motherboard;
   generating a code at the motherboard that uniquely identifies the motherboard;
   receiving code at the motherboard form the subsystem; from the subsystem;
   analyzing the code to determine if the code matches a code that uniquely identifies the motherboard; and
   allowing the subsystem device to function if and only if the code received from the subsystem matches the code that uniquely identifies the motherboard.

15. The motherboard of claim 14, wherein the subsystem is a hard drive.

16. The motherboard of claim 14 additionally configured to perform the following acts:
   analyzing an information storage space in the subsystem;
   determining that the information storage space is empty; and
   storing code that uniquely identifies the motherboard in the storage space.

17. The motherboard of claim 14 additionally configured to perform the following act:
   preventing booting of the subsystem if the received code differs from the code that uniquely identifies the motherboard.

18. The motherboard of claim 14, wherein the code that uniquely identifies the motherboard is a hash of a serial number of the motherboard.

19. The motherboard of claim 18 additionally configured to perform the following acts:
   accessing memory of the motherboard to obtain the serial number of the motherboard; and
   generating the hash of the serial number of the motherboard.

20. The motherboard of claim 14 additionally configured to perform the following acts:
   analyzing an information storage space in the subsystem;
   determining that the information storage space includes code;
   receiving unique authorization to overwrite the code in the information storage space; and
   overwriting the code in the information storage space with code that uniquely identifies the motherboard.

* * * * *